United States Patent [19]

Pettersen et al.

[11] Patent Number: 5,009,792
[45] Date of Patent: Apr. 23, 1991

[54] METHOD FOR CLARIFYING AQUEOUS SALT SOLUTIONS

[75] Inventors: Jarl M. Pettersen, Larvik; Arild Nilsson, Skien, both of Norway; Robert M. Millaway, Hayward, Calif.

[73] Assignee: Norsk Hydro a.s., Oslo, Norway

[21] Appl. No.: 425,977

[22] Filed: Oct. 24, 1989

[51] Int. Cl.$^5$ .............................. B03D 1/02
[52] U.S. Cl. .................... 210/705; 210/712; 210/714; 423/395
[58] Field of Search ............... 210/703–707, 210/714, 712, 726, 727, 729, 732, 738; 209/169; 423/395

[56] References Cited

U.S. PATENT DOCUMENTS

| | | | |
|---|---|---|---|
| 2,446,655 | 8/1978 | Lawrason | 210/705 |
| 3,179,252 | 4/1965 | Vrablik | 210/705 |
| 3,925,203 | 12/1975 | Turner | 210/706 |
| 3,966,598 | 6/1976 | Ettelt | 210/703 |
| 4,161,444 | 7/1979 | Moore | 209/169 |
| 4,203,837 | 5/1980 | Hoge et al. | 210/705 |
| 4,492,636 | 1/1985 | Burke | 210/705 |
| 4,790,944 | 12/1988 | Gordon et al. | 210/706 |

*Primary Examiner*—Peter Hruskoci
*Attorney, Agent, or Firm*—Wenderoth, Lind & Ponack

[57] ABSTRACT

The present invention relates to a method for clarifying aqueous salt solutions containing inorganic insolubles and possibly also organic components. Air is introduced into a recirculating system for the aqueous solution, pressurized and then released, thus forming microbubbles in the solution. Fluocculants are added and the presence of foam forming organic components is ensured. The foam formed is back-mixed into the solution while dissolved air flotation is interrupted, whereupon it may be restarted for flotation of possible remaining contaminants. The foam forming process can be performed in the presence of surfactants, wax and/or oil for forming a stable foam to be back-mixed into the solution for releasing entrapped microbubbles thereto. The method can be carried out by continuously supplying flocculant and solution to the flotation vessel. Dissolved air flotation and back-mixing are then carried out sequentially.

4 Claims, 2 Drawing Sheets

METHOD FOR CLARIFYING AQUEOUS SALT SOLUTIONS

BACKGROUND OF THE INVENTION (1) Field of the Invention

The present invention relates to a method for clarifying aqueous salt solutions containing inorganic insolubles and possibly also organic components as contaminants. The method comprises the addition of flocculants and the supply of microbubbles to the solution by means of dissolved air for flotation.

(2) State of the Prior Art

Removal of inorganic insolubles from aqueous solutions can in some cases be obtained by simply adding a flocculant to the solutions and allowing insolubles to settle, whereupon a clear solution can be decanted. However, in most cases such simple methods will be too time consuming or inefficient with regard to clarity of the salt solution. Flotation might give increased removal of insolubles, but if these have a density close to that of the salt solution itself, efficient separation of insolubles will not be obtained. If the salt solution also contains organic contaminants, the clarification might be even more difficult.

In separation technology, several special methods are known, like dissolved air flotation and froth flotation for clarifying contaminated solutions. Thus from U.S. Pat. No. 4,790,944, a flotation process is known for removing oil wastes and suspended solids from waste water in the petroleum industry. The separation may be enhanced by the use of coagulating agents such as salts of iron, aluminium or calcium, or organic polyelectrolytes. The main features of this known process are, however, the combination of dissolved gas and a stream of induced gas.

Further, in Chemical Engineer's Handbook, R. H. Perry/C. H. Chilton, 5th Ed., Section 21, pages 65-67, froth flotation to treat metallic ores is described using different types of flotation agents, dispersants or deflocculants and frothers. Commonly used frothers are pine oil, creolytic acid, propylene glycol ethers and aliphatic alcohols.

SUMMARY OF THE INVENTION

The main object of the present invention is to develop a simple method for clarifying aqueous salt solutions, primarily nitrate containing solutions, containing inorganic insolubles and possibly also organic components as contaminants.

A further object was to remove both inorganic insolubles and organic components from the solution by a simple and highly efficient flotation process.

The salt solutions which the inventors primarily sought to clarify contained varying amounts of inorganic insolubles and in some cases also organic components like wax, oil, and even minor amounts of surfactants. The average density of the components was quite close to the density of the salt solution itself, and thus clarification by simple settling and decanting was ineffective. Then the inventors tried to use dissolved air flotation techniques, which seemed promising provided the solution contained small amounts of insolubles together with organic components. The best results were obtained when the organic components and the inorganic insolubles formed a foamy sludge. If the contaminants consisted of inorganic insolubles only, it was almost impossible to obtain a clear solution by flotation.

In view of the enhanced clarification when organic components were present, the inventors continued the tests and then secured that foam forming organic components always were present. In order to obtain efficient flotation it was found that fairly large amounts of small gas bubbles had to be trapped in the sludge. A limiting factor seemed to be the stability of the foamy sludge. Further, it was found that the amount of inorganic insolubles relative to the amount of sludge was critical. Addition of flocculants like organic polyelectrolytes improved the efficiency of the clarificattion. However, even with addition of flocculants and relatively stable foam consistancy of the sludge it was difficult to obtain a clear salt solution when it initially contained relatively large amounts, for instance 19 grams/liter (about 1.3 weight %) of inorganic insolubles. Then, it was surprisingly found that this problem could be overcome by back-mixing at least part of the foamy sludge into the aqueous solution.

In order to further test the promising clarification method a simple apparatus for batch flotation was designed, and clarification of several types of solutions was tested.

BRIEF DESCRIPTION OF THE DRAWINGS

The invention will be further explained in connection with the below description of an apparatus according to the invention and the accompanying examples, in connection with the accompanying drawings, in which.

DETAILED DESCRIPTION OF THE PREFERRED EMBODIMENTS

Figure 1:
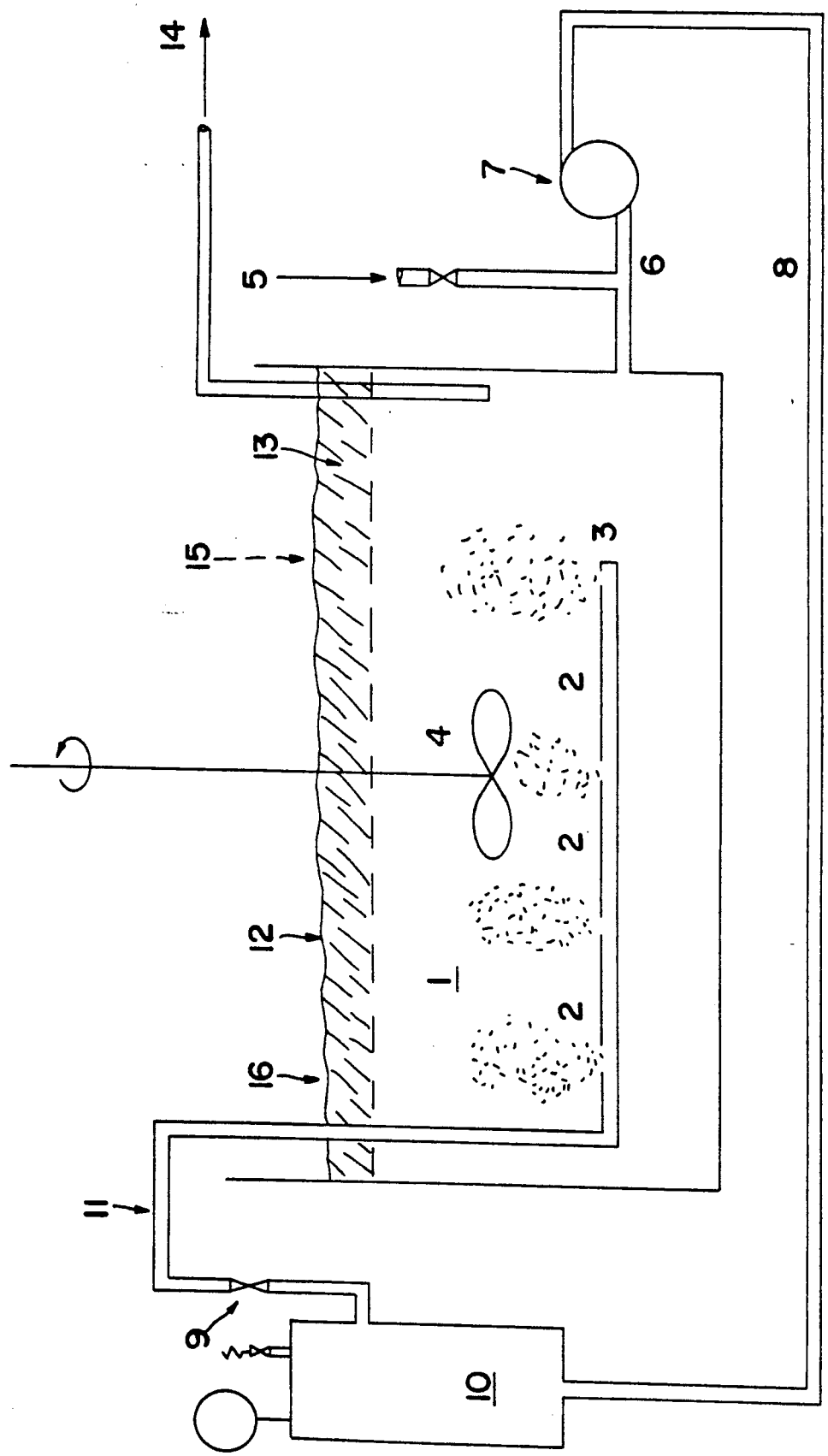
FIG. 1 shows an apparatus for clarifying salt solutions by a batch process.

In FIG. 1 is shown removal of contaminants from a salt solution in a vessel 1. The clarification was carried out by a batch process, whereby the vessel 1 first was filled by a salt solution comprising organic components and inorganic insolubles. The salt solution was circulated through a pressurized loop as follows:

Air was sucked through a pipe 5 into a solution pipe 6, and a pump 7 transferred the solution through a pipe 8 to a cylinder 10 where the pressure was released through least one valve 9. The salt solution containing dissolved air was transferred to the vessel 1 through pipe(s) 11 and pipes 3 at the lower section of the vessel. Dissolved air was released as microbubbles into the salt solution through multiple openings 2 in pipe 3. Floated contaminants formed a foamy sludge 13 on top of the solution. Flocculant 16 was then added to the solution. At least some of the foamy sludge 13 was back-mixed into the solution by the mixer 4. Dissolved air flotation was then restarted by the pump 7, and air released from the back-mixed sludge together with the dissolved air released through the openings 2 resulted in an almost complete clarification of the solution both with regard to the organic contaminants and the inorganic insolubles. The contaminants could then easily be skimmed off from the top of the vessel 1. Clarified salt solution could be drawn through pipe 14.

Figure 2:
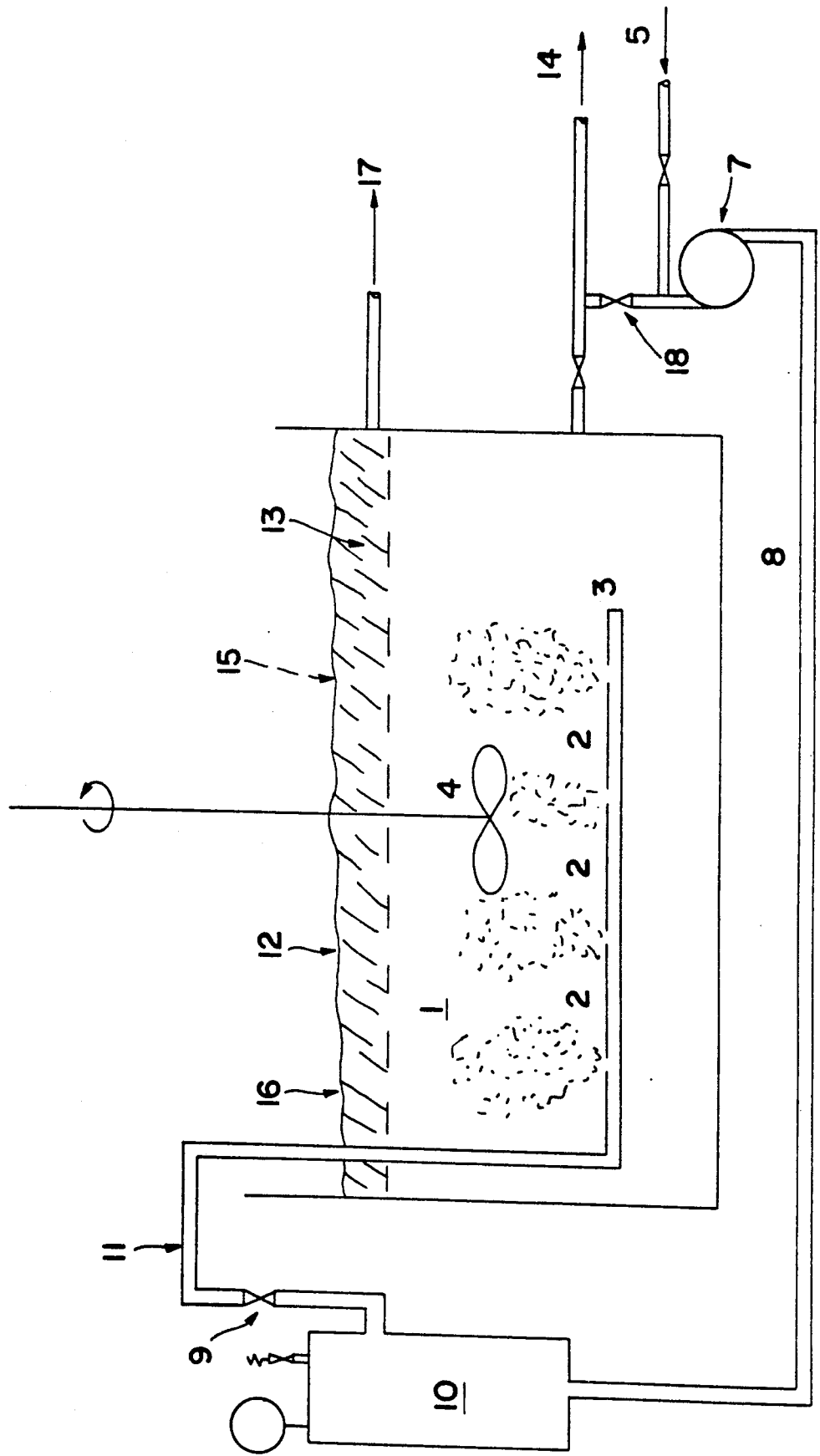
FIG. 2 shows an apparatus for a continuous clarification process.

FIG. 2 shows an apparatus for continuous purification of salt solution. The arrangement is basically as shown in FIG. 1, and the same reference numbers are used for corresponding elements in both figures. Salt solution 12 and flocculant 16 can be supplied continuously or intermittently to the vessel 1. Additives 15 might be added to the vessel 1 if the salt solution does not contain such additives already as organic contaminants. Floated sludge 13 containing both organic and inorganic insolubles could be removed at 17 by a skimming device (not shown). Purified solution was withdrawn from the lower section of the vessel 1 through pipe 14. Salt solution was recirculated through a branch pipe 18 by means of the pump 7 and transferred through pipe 8, cylinder 10, valve a, and pipes 11 and 3 into the vessel 1. Air was sucked into the salt solution through pipe 5 ahead of the pump 7.

The continuous clarification process is preferably performed by intermittently starting the mixer for back-mixing sludge. The supply of dissolved air through openings 2 by means of the circulating salt solution can be continuous or intermittent.

A continuous process can also be obtained by having several stages of apparatus shown in FIG. 1 connected together.

EXAMPLE 1

The example describes a batch process carried out in an apparatus shown in FIG. 1. 9 tons of an aqueous solution comprising 3.6 tons calcium nitrate, 2.8 tons ammonium nitrate, 2.6 tons water and 0.9 weight % inorganic insolubles and 0.1 weight % organic contaminants was placed in vessel 1. The circulation pump 7 was started and streams of microbubbles (40-100 μm) floated the organic contaminants and some of the inorganic insolubles which formed a sludge on top of the solution, which had obtained a milky appearance. Anionic flocculant was added during the dissolved air flotation. Then the pump 7 was stopped and the sludge was back-mixed into the solution, whereupon the circulation pump was started again for further flotation. Now a completely clear solution was obtained.

The sludge initially formed contained, obviously, microbubbles which were released into the solution when the sludge was back-mixed. By means of the microbubbles released from the sludge and those supplied by the circulation system it was possible to float all the inorganic insolubles originally contained in the solution. The organic compounds present comprised wax, oil and surfactant which together with the flocculant, which when exposed to the stream of microbubbles, formed a stable foamy sludge containing entrapped microbubbles.

The temperature in the vessel was kept just above the melting point of the wax/oil compound, and this seemed to be of importance for obtaining a sufficiently stable foam which could endure back-mixing without collapsing completely. Thus the sludge was transported deep into the solution before the microbubbles were released.

EXAMPLE 2

A salt solution containing only inorganic insolubles was placed in vessel 1 and the circulation pump was started to produce microbubbles for flotation of the contaminants. But only a small fraction of the insolubles was floated together with the flocculant. A foamy sludge was not formed and back-mixing of the sludge did not improve the flotation efficiency. Then organic compounds of corresponding type and amounts as those present in the solution of Example 1 was added. The flotation process was restarted and performed as in Example 1 and a clear clarified solution was obtained.

EXAMPLE 3

Clarification of a contaminated salt solution such as that used in Example 1 was carried out in an apparatus according to FIG. 2. The solution and flocculant were continuously supplied to vessel 1, and clarified solution was removed from vessel 1 to pipe 14. Part of the clarified solution could be recirculated through a system similar to that used in Example 1 for supplying dissolved air in the form of microbubbles into the lower section of vessel 1.

For the continuous process, in order to get sufficient air bubbles for flotation of the inorganic insolubles, it also was necessary to utilize the air entrapped in the formed foam.

The circulation system was run for about one hour and then stopped. A layer of foamy sludge was formed on top of the solution. Then the mixer 4 was started and sludge was back-mixed into the solution for less than one minute, whereupon the circulation system was re-started. It was found that the continuous process should be carried out by using the above described sequence for recirculation and back-mixing. Further, it was found that sludge could be skimmed off from the top of the solution as long as there remained sufficient sludge for back-mixing guaranteeing a supply of microbubbles released into the solution.

The example shows that by the present invention it is possible to clarify aqueous salt solutions that previously could not be clarified by simple dissolved air flotation or decanting methods.

It is imperative that a relatively stable foamy sludge is formed. This sludge must contain entrapped air from the microbubbles released into the solution when back-mixed. Thus, organics capable of forming such a sludge must be present in the solution either as contaminants or separately added. Further, it has been found necessary to utilize flocculants which will migrate with the sludge and contribute to the desired structure of the sludge. Useful flocculants are those commonly known in the art, such as organic polyelectrolytes. The other necessary organic components include surfactants such as fatty acids, their soaps, petroleum sulfonates, fatty acid amines and their salts.

Finally, oil and/or wax should be present. It has been found that especially waxes like petroleum wax will contribute to the stability of the sludge. Formation of a stable foam is favored when the temperature of the solution is kept just above the melting point of the wax-/oil component.

The method according to the invention is especially useful in clarifying aqueous fertilizer solutions for use in green-houses or drip fertilization wherein contaminants can cause plugging problems in pipes, valves and emitters of the distribution system.

The inventors have by the new method been able to remove both inorganic and organic contaminants from aqueous salt solution in a simple and inexpensive way. The apparatus for carrying out the method consists of known and reliable components. The apparatus and the method have proved to be most reliable and can easily be adjusted for handling various types of contaminated aqueous salt solutions.

We claim:

1. A method of clarifying an aqueous salt solution containing inorganic insolubles, comprising:
   providing a vessel for the aqueous salt solution;

providing a recirculating system for the aqueous salt solution in said vessel circulating aqueous salt solution therefrom and thereto;

introducing air into said recirculating system;

pressurizing said air in said recirculating system;

releasing said air into said aqueous salt solution such that said air forms microbubbles in said aqueous salt solution;

adding flocculants to said aqueous salt solution;

ensuring the presence of sufficient foam forming organic components in said aqueous salt solution to form a stable foamy sludge, wherein said air, said flocculants and said organic components form the stable foamy sludge on said aqueous salt solution, flotating said inorganic insolubles out of said aqueous salt solution;

interrupting the release of said air into said aqueous salt solution;

back-mixing a portion of said stable foamy sludge into said aqueous salt solution; and restarting the release of said air into said aqueous salt solution for the flotation of remaining said inorganic solubles to obtain a clarified aqueous salt solution.

2. The method of clarifying an aqueous salt solution as set forth in claim 1, wherein said step of ensuring the presence of foam forming organic components comprises ensuring the presence of surfactants and at least one of wax and oil, whereby a stable foamy sludge is formed for back-mixing and releasing entrapped microbubbles into said aqueous salt solution.

3. The method of clarifying an aqueous salt solution as set forth in claim 1, and further comprising:

continuously supplying said aqueous salt solution to said vessel, wherein said step of adding flocculants is carried out continuously; and sequentially carrying out said step of releasing said air into said aqueous salt solution for forming said stable foamy sludge and flotating said inorganic insolubles and said step of back-mixing a portion of said stable foamy sludge.

4. A method of clarifying an aqueous salt solution containing inorganic insolubles, comprising:

providing an aqueous salt solution having inorganic insolubles therein;

releasing pressurized air into said aqueous salt solution such that said air forms microbubbles in said aqueous salt solution;

adding flocculants to said aqueous salt solution;

ensuring the presence of sufficient foam forming organic components in said aqueous salt solution to form a stable foamy sludge, wherein said air, said flocculants and said organic components form a stable foamy sludge on said aqueous salt solution, flotating said inorganic insolubles out of said aqueous salt solution;

interrupting the release of said air into said aqueous salt solution;

back-mixing a portion of said stable foamy sludge into said aqueous salt solution; and restarting the release of said air into said aqueous salt solution for the flotation of remaining said inorganic solubles to obtain a clarified aqueous salt solution.

* * * * *